United States Patent [19]
Kovacich et al.

[11] Patent Number: 5,559,280
[45] Date of Patent: Sep. 24, 1996

[54] COMBUSTION CHAMBER PRESSURE TRANSDUCER AND METHOD OF MAKING SAME

[75] Inventors: John A. Kovacich, Wauwatosa, Wis.; Donald R. Haefner, Oak Park, Mich.; Bruce M. Hatton, Carol Stream, Ill.; Donald M. Stout, Troy, Mich.; Lawrence J. Ryczek, Oconomowoc; Arlene M. Klumb, Richfield, both of Wis.

[73] Assignee: Eaton Corporation, Cleveland, Ohio

[21] Appl. No.: 339,097

[22] Filed: Nov. 14, 1994

[51] Int. Cl.$^6$ ............................ G01L 7/08; G01L 9/06
[52] U.S. Cl. ............................ 73/35.13; 73/721; 73/727
[58] Field of Search ........................ 73/115, 117.3, 73/727, 35 P, 720, 721, 35.11, 35.13

[56] References Cited

U.S. PATENT DOCUMENTS

| | | | |
|---|---|---|---|
| 4,382,377 | 5/1983 | Kleinschmidt et al. | 73/35 |
| 4,524,625 | 6/1985 | Takeuchi | 73/35 |
| 4,660,409 | 4/1987 | Miyata et al. | 73/35 |
| 4,672,839 | 6/1987 | Takeuchi et al. | 73/35 |
| 4,773,269 | 9/1988 | Knecht et al. | 73/721 |
| 4,774,843 | 10/1988 | Ghiselin et al. | 73/727 |
| 5,199,303 | 4/1993 | Benedikt et al. | 73/727 |
| 5,310,610 | 5/1994 | Furubayashi et al. | 73/727 |
| 5,315,875 | 5/1994 | Benedikt et al. | 73/727 |
| 5,317,923 | 6/1994 | Erichsen et al. | 73/727 |
| 5,333,505 | 8/1994 | Takahashi et al. | 73/727 |
| 5,349,867 | 9/1994 | Park | 73/727 |
| 5,357,807 | 10/1994 | Guckel et al. | 73/721 |

Primary Examiner—Richard Chilcot
Assistant Examiner—George M. Dombroske
Attorney, Agent, or Firm—Roger A. Johnston

[57] ABSTRACT

A transducer housing for mounting a port in a combustion chamber has a metal diaphragm exposed to the combustion gasses. The pressure of the combustion gasses deflects the diaphragm which locally deflects a simply supported beam. The beam is formed of refractory material having epitaxially grown crystalline piezoresistors formed on one surface of the beam and connected in a bridge circuit. Noble metal foil leads connect to the piezoresistors to form the bridge and provide attachment pads. The pads are noble metal welded to other noble metal foil pads provided on a ceramic substrate to form a sensor subassembly for mounting adjacent the diaphragm to form a transducer.

17 Claims, 4 Drawing Sheets

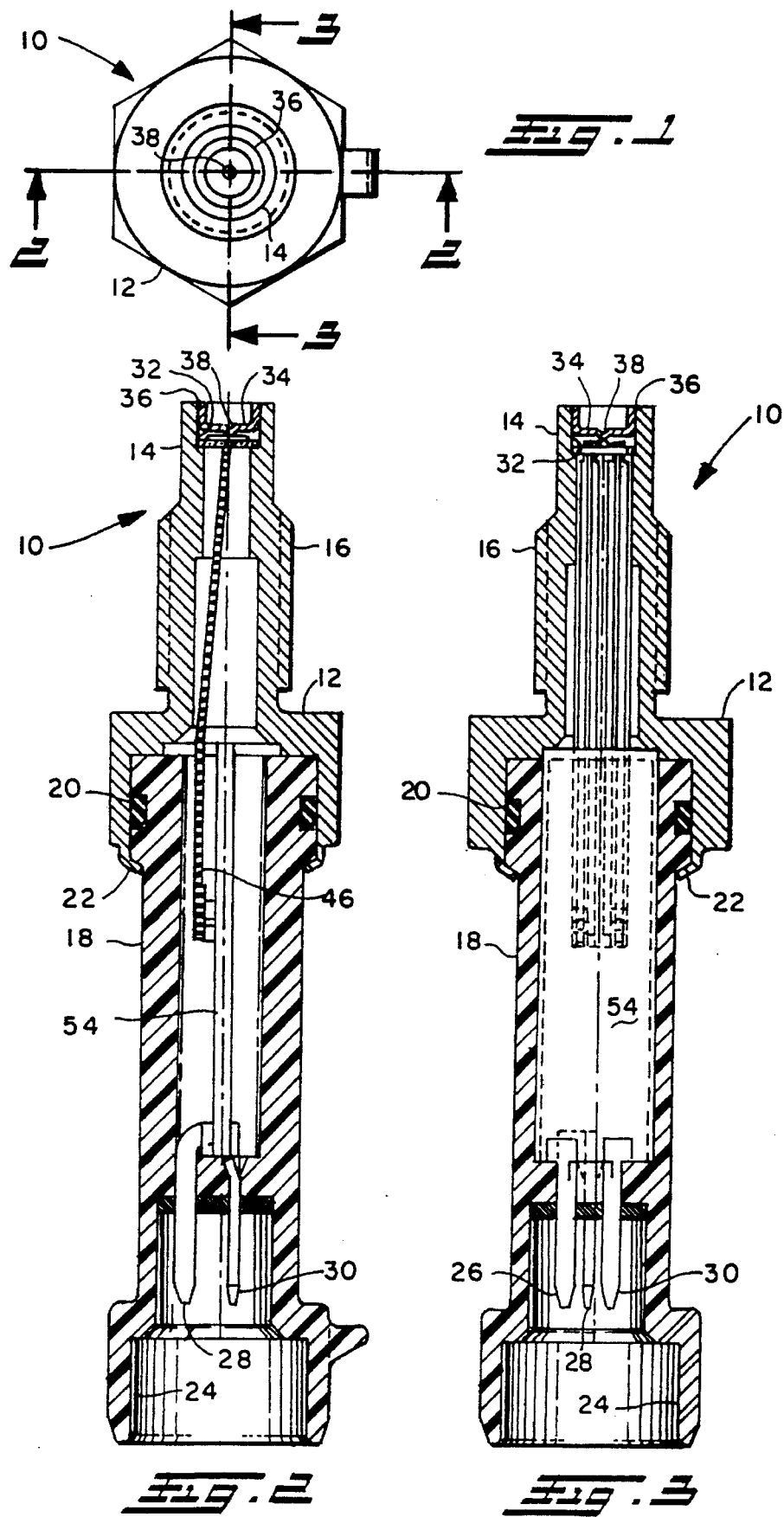

COMBUSTION CHAMBER PRESSURE TRANSDUCER AND METHOD OF MAKING SAME

BACKGROUND OF THE INVENTION

The present invention relates to instruments for sensing the instantaneous pressure in a combustion chamber such as in the combustion chamber of a reciprocating internal combustion engine. Combustion chamber pressure transducers have found particular application in reciprocating internal combustion engines for detecting combustion anomalies such as detonation or "knocking", misfiring and pre-ignition. Pressure transducers of this type are typically mounted through a port in the combustion chamber such as a threaded hole in the cylinder head and are employed for knock sensing to provide an electrical signal to an engine control computer for controlling retarding of the ignition spark timing to prevent knocking. Knock sensors have become a critical element in the management of the spark ignition timing in reciprocating internal combustion engines employed for passenger and light truck automotive engines for controlling the exhaust emissions.

Heretofore, knock sensors or transducers for internal combustion engine usage have employed a metal diaphragm exposed to the combustion chamber gasses which moved an intermediate member to provide a force against a sensing element to generate an electrical signal indicative of the combustion pressure forces on the pressure responsive diaphragm. The problem of providing the motion transmitter or linkage between the pressure responsive diaphragm exposed to the combustion gasses and the sensing element has resulted in a transducer which did not have the desired response time to properly track the pressure increases due to detonation or knocking; and, thus the transducer was not capable of providing an adequate electrical signal for enabling the engine controller to retard timing in a timely fashion to adequately attenuate incipient knocking. Thus it has been desired to provide a combustion chamber pressure transducer capable of responding instantaneously to the unusually high combustion chamber pressures resulting from detonation and knocking in order to enable the engine controller to respond with changes in ignition timing to eliminate the detonation or knocking. In addition, the extremely high temperatures of the combustion event apply steep temperature gradients and high heat loads to the face and internals of the device as it is positioned in the wall of the combustion chamber. The high temperatures affect the response, performance and location of the sensing element resulting in higher cost for the transducer capable of functioning in such an environment.

SUMMARY OF THE INVENTION

It is an object of the present invention to provide a transducer having a pressure responsive member operable in response to sensed combustion chamber pressures to act upon a piezoresistive element disposed adjacent the side of the pressure responsive member opposite the combustion chamber gasses to provide rapid generation of an electrical signal responsive to the combustion chamber pressure forces on the member.

It is a further object of the present invention to provide a simply supported beam having piezoresistors thereon for localized deflection by a diaphragm exposed to combustion chamber pressures to rapidly generate an electrical signal indicative of the changes in the combustion chamber pressures.

It is a further object of the present invention to provide a transducer having a pressure responsive diaphragm exposed to the combustion chamber gasses and which in response thereto effects localized deflection of a simply supported beam formed of refractory material having piezoresistors thereon for generating an electrical signal indicative of the changes in the combustion chamber pressure.

It is a further object of the present invention to provide a pressure responsive member which deflects a simply supported beam of refractory material with epitaxially grown crystalline piezoresistors thereon operative to electrically indicate beam deflection.

The present invention provides a transducer having a housing with a pressure responsive diaphragm therein which is suitable for exposure to combustion chamber pressures sensed through a port in the combustion chamber. The housing has mounted thereon a refractory substrate with a beam simply supported thereon and disposed for localized deflection by the pressure responsive member. The beam is formed of refractory material preferably of crystalline variety and has epitaxially grown thereon piezoresistive crystal refractory material which upon deflection of the beam produces an electrical signal indicative of the deflection. The piezoresistors have attached thereover electrically conductive strips which form pads; and, the beam is secured to the substrate by noble metal weldment in the region of the pads. Electrical connectors are attached to each of the weldments to provide electrical connection to the piezoresistive elements which preferably are connected in a Wheatstone bridge arrangement for generating the electrical signal indicative of the deflection and corresponding pressure forces on the diaphragm.

BRIEF DESCRIPTION OF THE DRAWINGS

FIG. 1 is an end view of the transducer of the present invention showing the pressure responsive diaphragm installed in the housing;

FIG. 2 is a section view taken along section indicating lines 2—2 of FIG. 1;

FIG. 3 is a section view taken along section indicating liens 3—3 of FIG. 1 and rotated 90°;

DETAILED DESCRIPTION

Figure 4:
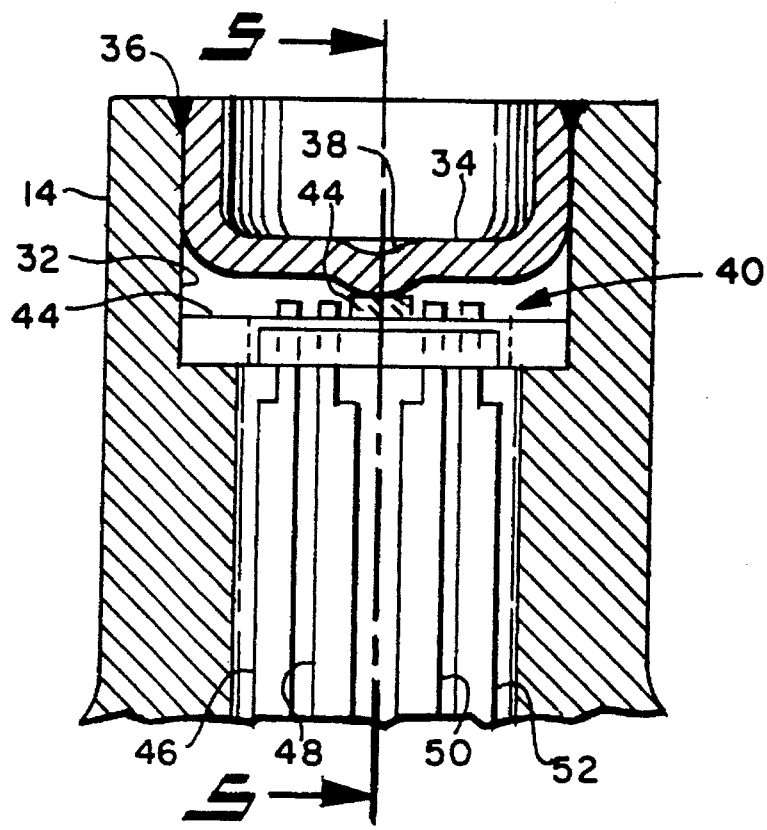
FIG. 4 is an enlarged view of the upper portion of FIG. 3.

Referring to FIGS. 1–3, the transducer of the present invention is indicated generally at 10 and has a body 12 which has a reduced diameter portion 14 extending from one end thereof which has external threads 16 which are adapted for engaging corresponding threads in a combustion chamber port in an engine.

The body 12 has attached thereto an extension portion 18 which is sealed by a seal ring 20 in the body and retained thereon by any suitable expedient, as for example, crimping a portion of the body as denoted by reference numeral 22. The extension 18 defines in the free end thereof an electrical receptacle 24 which has provided therein a plurality of connector terminals denoted by reference numerals 26,28, 30.

The reduced diameter end 14 of the body 12 has provided in a cavity 32 formed in the end thereof a generally cup-shaped pressure responsive diaphragm 34 which is secured in the cavity 32 preferably by weldment denoted by reference numeral 36. The diaphragm 34 has a dimpled portion 38 formed in the center thereof for applying a force to the sensor element as will hereinafter be described.

Figure 5:
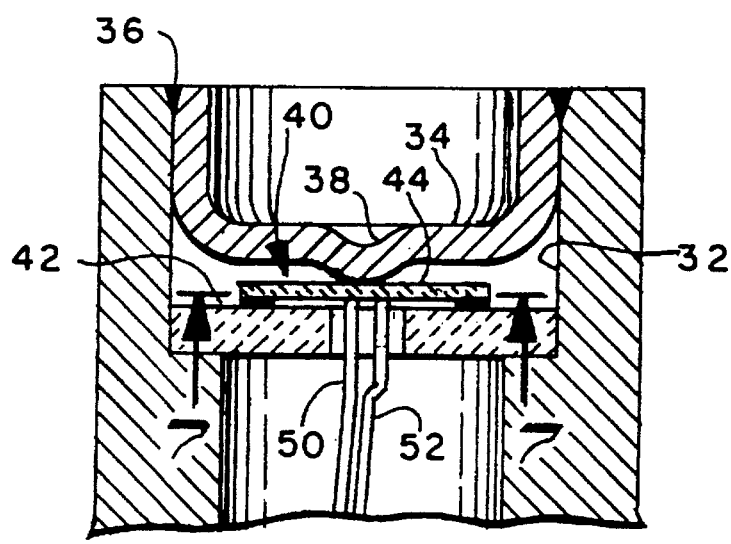
FIG. 5 is a section view taken along section indicating lines 5—5 of FIG. 4.

Referring to FIGS. 4 and 5, the sensor element or subassembly is indicated generally at 40 and includes a substrate or mounting disc 42 with a beam member 44 simply supported thereon with electrical leads denoted by reference numerals 46,48,50,52 each having one end attached to the substrate 42 as will hereinafter be described.

Referring to FIGS. 2 and 3, a printed circuit board 54 is disposed within the extension 18 and has one end of each of the terminals 26,28,30 attached to circuitry thereon. Each of the leads 46,48,50,52 also has one end thereof attached to connectors provided on the printed circuit board 54.

Figure 6:
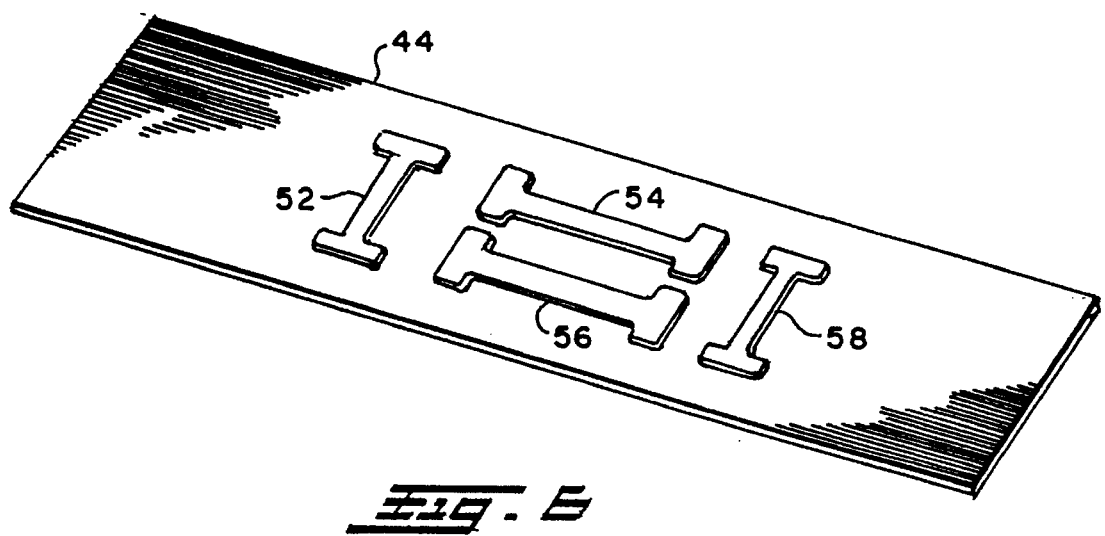
FIG. 6 is an axonometric view of the sensor beam with the piezoresistors formed thereon.
Figure 7:
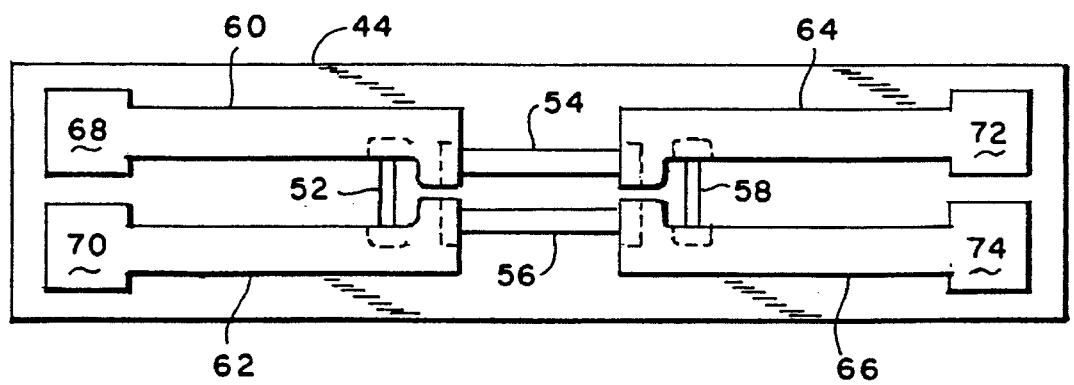
FIG. 7 is a section view taken along section indicating lines 7—7 of FIG. 5.

Referring to FIGS. 6 and 7, the beam 44 is shown as formed with the discrete piezoresistor elements 52,54,56,58 formed on one surface or face thereof shown in FIG. 6 as the upper surface thereof. The piezoresistors are arranged in a pattern whereby two of the elements 52,58 are aligned transversely to the longitudinal dimension of the beam 44; and, the remaining two piezoresistive elements 54,56 are disposed in spaced parallel arrangement and aligned with the longitudinal direction of the beam. In the presently preferred practice of the invention, the beam 44 is formed of crystalline silicon carbide material; and, the piezoresistive elements 52,54,56,58 are epitaxially grown crystals of doped silicon carbide material both of which may be obtained as a unit from Cree Research, Inc., 2810 Meridian Parkway, Durham, N.C. 27713. It will be understood that the piezoresistive elements are formed on the surface of the beam 44 with an orientation such that the elements may be connected into a Wheatstone bridge circuit as will be hereinafter described.

Referring to FIG. 7, the beam 44 is shown with electrically conductive strips 60,62,64,66 laid upon the surface thereof with strip 60 having one end thereof electrically connected to one end of both of the strips 52,54; and, strip 60 extends along the surface of the beam 44 to form a connector pad 68 on one end thereof adjacent the end of the beam. Strip 62 is disposed in generally spaced parallel relationship to the strip 60; and, strip 62 has one end thereof electrically interconnecting the opposite end of piezoresistor 52 and one end of piezoresistor 56. Strip 62 extends along the beam 44 to form an electrical connecting pad 70 at the end thereof remote from the piezoresistive strips. Electrically conductive strip 64 is electrically connected to the remaining end of piezoresistive strip 54 and also to one end of piezoresistor 58; and, strip 64 extends along beam 44 to have the end of strip 64 form a pad 72 at the end of the beam 44 remote from the piezoresistor 58. Electrically conductive strip 66 has one end thereof electrically connected to the remaining end of piezoresistor 56 and also to the remaining end of piezoresistor 58; and, strip 66 extends along the beam 44 in spaced parallel relationship to strip 64 and has the end thereof remote from piezoresistor 58 forming an electrical contact pad 74. In the presently preferred practice the strips 60,62,64,66 are formed of gold and may be plated over an oxide layer on the surface of beam 44.

It will be understood that by electrically connecting to the pads 68,70,72,74 the piezoresistive elements 52,54,56,58 electrically form a Wheatstone bridge and thus can provide an electrical signal indicative of flexure or bending of the beam 44.

Figure 8:
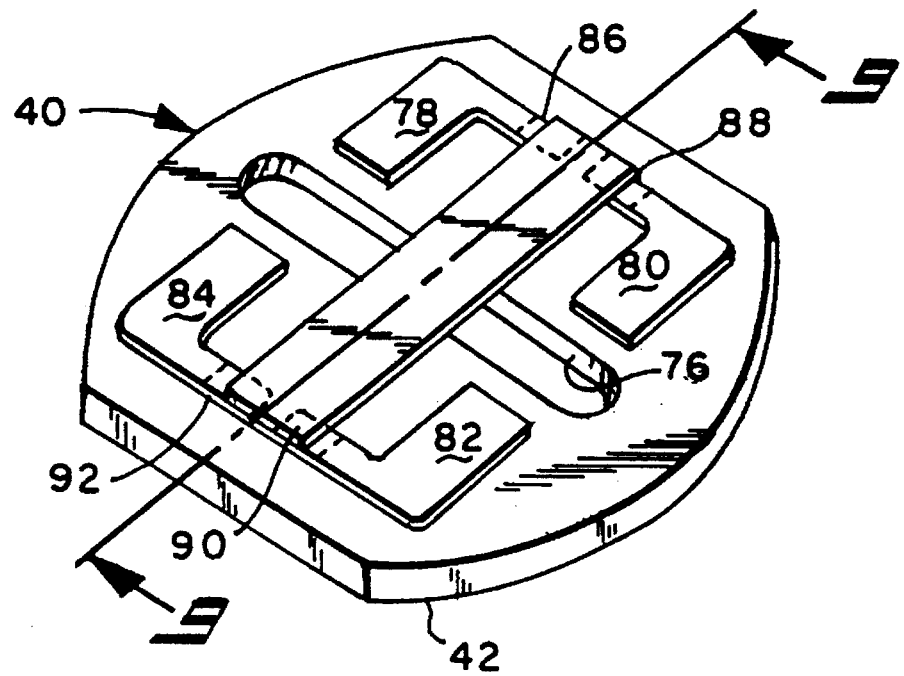
FIG. 8 is an axonometric view of the sensor subassembly of the embodiment of FIG. 1; and, FIG. 9 is a section view taken along section indicating lines 9—9 of FIG. 8.
Figure 9:
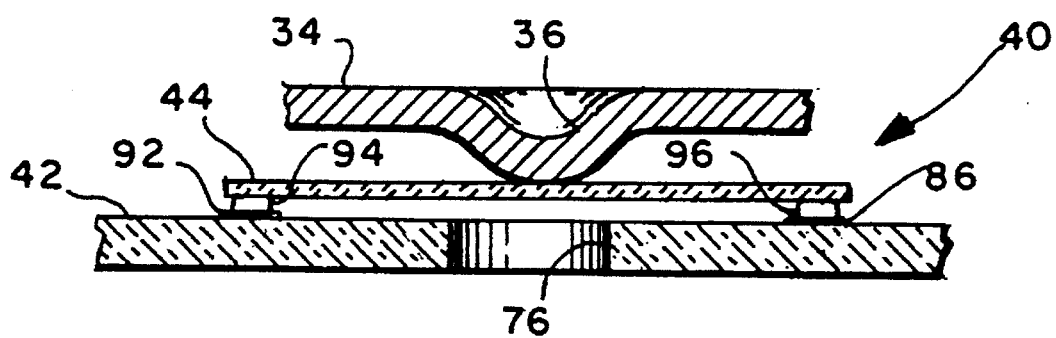

Referring to FIGS. 8 and 9, the substrate 42 is shown as having a central slot 76 formed therethrough with a plurality of electrically conductive thin film strips preferably formed of noble metal provided on the surface thereof. In the presently preferred practice, the substrate 42 is formed of refractory or ceramic such as aluminum oxide.

With reference to FIG. 8, the strips are disposed in quadrature and each have one end thereof forming an enlarged pad for attachment thereto as denoted by reference numerals 78,80,82,84. In the presently preferred practice the strips and pads are formed of silver material; and, each has an end portion formed of gold as denoted respectively by reference numerals 86,88,90,92.

Referring to FIG. 9, the beam of FIG. 7 is shown as placed onto the substrate with a noble metal pellet disposed in each corner thereof and contacting one of the pads 68,70,72,74 on the undersurface of the beam and also one of the pads 78,80,82,84 on the substrate. The beam in FIG. 9 is then subjected to pressure and heating so as to effect melting of the pellets, two of which are visible in FIG. 9 and denoted by the reference numerals 94,96 to effect weldment of the pads 68,70,72,74 on the undersurface of beam 44 each to respectively one of the gold strips 86,88,90,92 on the substrate 42. The substrate 42 with the beam attached thereto as shown in FIG. 9 then has the electrical connector strips (see FIG. 4) 46,48,50,52 each having one end extended through the slot 76 and attached by weldment respectively to one of the pads 78,80,82,84 on the substrate to provide electrical connection between the leads and the Wheatstone bridge circuit formed by the piezoresistors on the undersurface of beam 44. The assembly of the element 40 with the electrical leads 46,48,50,52 is then assembled into the body and the diaphragm member 34 inserted therein with the dimple 38 contacting the center of beam 44, whereupon the diaphragm cup 34 is welded into the body as denoted by reference numeral 36 (see FIG. 4).

The opposite end of the leads 46,48,50,52 are then connected to the printed circuit board which may be inserted into the body extension 18 which may then be crimped onto the body 12. It will be understood that the transducer of the present invention provides direct contact of the piezoresistors with the underside of the diaphragm which has its opposite side exposed to the combustion pressures and temperature of the combustion chamber gasses. The refractory material of the beam 44 is able to withstand the temperatures of the diaphragm undersurface as the diaphragm is heated by the combustion chamber gasses. The direct deflection of beam 44 with the piezoresistors thereon by the pressure responsive diaphragm 34 thus eliminates intermediate linkages and improves the accuracy and response time of the present transducer.

Although the invention has hereinabove been described with respect to the illustrated embodiments, it will be understood that the invention is capable of modification and variation and is limited only by the following claims.

I claim:

1. A method of sensing combustion pressure in a port in the combustion chamber of an internal combustion engine comprising:

(a) forming a beam of refractory piezoresistive material and supporting said beam at its ends for bending;

(b) supporting a pressure responsive diaphragm in said port with one side thereof exposed to the combustion;

(c) disposing said beam adjacent the side of said diaphragm opposite said combustion with a portion of said diaphragm contacting said beam and applying to said beam a force indicative of the combustion pressure forces acting on said diaphragm; and, (d) deflecting said beam with said force and generating an electrical signal representative of said beam deflection.

2. The method defined in claim 1, wherein said step of supporting a diaphragm includes forming a cup-shaped member and attaching the rim thereof to a body member.

3. The method defined in claim 1, wherein said step of supporting a diaphragm includes forming a cup-shaped member and attaching the rim thereof to a body member; and, said steps of contacting said beam and transmitting a force includes forming a projection in said cup-shaped member.

4. The method defined in claim 1, wherein said step of forming a beam includes forming an elongated metallic member and coating at least one surface for the length thereof with refractory piezoresistive material.

5. A combustion chamber transducer comprising:

(a) body structure adapted for mounting in a sensing port in a combustion chamber and defining a cavity therein;

(b) a resilient pressure responsive diaphragm closing said cavity and formed of material capable of withstanding the temperatures and pressures of said combustion chamber;

(c) a beam of piezoresistive material supported in said body structure cavity with a certain portion of said diaphragm contacting said beam; and, (d) responsive to combustion pressure movement of said diaphragm, said certain portion is operative for effecting bending of said beam and thereby generating an electrical signal indicative of said bending.

6. The transducer defined in claim 5, wherein said beam is supported at its ends on a pad of refractory material.

7. The transducer defined in claim 5, wherein said beam is supported at its end by weldment on a pad of refractory material.

8. The transducer defined in claim 5, wherein said beam is supported on a pad of refractory material and includes electrical lead means attached to said pad.

9. The transducer defined in claim 5, wherein said diaphragm comprises a cup-shaped metal member.

10. The transducer defined in claim 5, wherein said diaphragm comprises a cup-shaped metal member and said certain diaphragm portion includes a projection formed in said cup-shaped member.

11. The transducer defined in claim 5, wherein said locally supported beam includes electrical connections through the supports thereof.

12. The transducer defined in claim 5, wherein said locally supported beam is supported at its ends and said end supports are electrically conductive.

13. The transducer defined in claim 5, wherein said beam is simply supported at its ends.

14. A combustion chamber pressure transducer comprising:

(a) housing means adapted for installation in a combination chamber port;

(b) a substrate formed of nonconductive refractory material and mounted on said housing means;

(c) an elongated beam formed of crystalline refractory material and having a plurality of piezoresistors formed by epitaxial crystalline growth on a surface of said beam;

(d) a plurality of electrically conductive leads formed on said surface of said beam, said leads each attached to one of said piezoresistors;

(e) weldment means attaching the opposite ends of said beam to said substrate; and, (f) pressure responsive means mounted on said housing means and having a certain portion thereof contacting said beam and upon exposure of said diaphragm to said combustion pressure said certain portion is operable to effect deflection of said beam for causing said piezoresistors to generate a signal indicative of said deflection.

15. The transducer defined in claim 14, wherein said electrical leads are formed of noble metal.

16. The transducer defined in claim 14, wherein said weldment means comprises a noble metal weld.

17. The transducer defined in claim 14, wherein said piezoresistors are formed of silicon carbide (SIC) material.

* * * * *